(12) United States Patent
    Smith

(10) Patent No.: US 9,300,425 B2
(45) Date of Patent: Mar. 29, 2016

(54) DWDM HYBRID PON LT CONFIGURATION

(75) Inventor: Joseph Lee Smith, Fuquay Varina, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 815 days.

(21) Appl. No.: 11/771,354

(22) Filed: Jun. 29, 2007

(65) Prior Publication Data
    US 2009/0003829 A1    Jan. 1, 2009

(51) Int. Cl.
    *H04J 14/02*    (2006.01)
(52) U.S. Cl.
    CPC ............. *H04J 14/02* (2013.01); *H04J 14/0246* (2013.01); *H04J 14/0247* (2013.01); *H04J 14/0252* (2013.01); *H04J 14/0226* (2013.01); *H04J 14/0282* (2013.01)
(58) Field of Classification Search
    USPC ....................................... 398/58–79, 164–169
    See application file for complete search history.

(56) References Cited

U.S. PATENT DOCUMENTS

| | | | | |
|---|---|---|---|---|
| 5,550,666 | A * | 8/1996 | Zirngibl | 398/72 |
| 6,144,472 | A * | 11/2000 | Knox | 398/168 |
| 6,151,144 | A * | 11/2000 | Knox | 398/79 |
| 6,674,968 | B1 * | 1/2004 | Xie | 398/79 |
| 6,970,653 | B1 * | 11/2005 | Dudley | 398/169 |
| 2005/0175343 | A1 * | 8/2005 | Huang et al. | 398/66 |
| 2006/0088319 | A1 * | 4/2006 | Morton | 398/79 |
| 2007/0019956 | A1 * | 1/2007 | Sorin et al. | 398/71 |
| 2007/0133923 | A1 * | 6/2007 | Park et al. | 385/14 |
| 2007/0166037 | A1 * | 7/2007 | Palacharla et al. | 398/72 |
| 2008/0050119 | A1 * | 2/2008 | Effenberger | 398/68 |
| 2008/0232804 | A1 * | 9/2008 | Absillis | 398/71 |
| 2008/0273877 | A1 * | 11/2008 | Palacharla et al. | 398/64 |

* cited by examiner

*Primary Examiner* — Li Liu
(74) *Attorney, Agent, or Firm* — RGIP LLC

(57) ABSTRACT

A method, a system, and an optical transceiver board for use in a Passive Optical Network (PON), comprising a line terminal (LT) card comprising a plurality of transmitters and one receiver, a Dense Wave Division Multiplex (DWDM) combiner, wherein the LT card is communicably coupled to the DWDM combiner, and a broadband wavelength division multiplexer (WDM) communicably coupled to the DWDM combiner.

13 Claims, 4 Drawing Sheets

DWDM HYBRID PON LT CONFIGURATION

FIELD OF THE INVENTION

The present disclosure is generally related to Passive Optical Networks (PONs) and more particularly to a method, system, and computer readable medium, or software, for a Dense Wavelength Division Multiplexing (DWDM) hybrid PON Line Terminal (LT) configuration. Where "N" DWDM optical channels leave the LT, but only one optical channel returns to the LT.

BACKGROUND OF THE INVENTION

In a traditional optical transceiver board, there is a matched set of optical transmitter (TX) and receiver (RX) entities, or ports. While the traditional approach of having a receiver matched with a transmitter is still possible, it is inefficient for certain PON scenarios.

The traditional approach of managing the TX and RX ports would use four RX circuits which would then match Media Access Control (MAC) interface electronics. The Media Access Control (MAC) data communication protocol sublayer is the part of the seven-layer OSI model data link layer (layer 2). It provides addressing and channel access control mechanisms that make it possible for several terminals or network nodes to communicate within a multipoint network. The MACs would then be managed for the respective portion of the total upstream traffic from the Optical Network Terminal (ONT) on the PON. A passive optical network (PON) is a system that brings optical fiber cabling and signals all or most of the way to the end user. A PON consists of an Optical Line Termination (OLT) at the communication company's office and a number of Optical Network Units (ONUs) near end users. A PON typically consists of an OLT, which resides in a Central Office (CO). The OLT typically services a number of ONUs that are usually connected in a star arrangement using optical splitters, which reside at a premise of a user. PONs are designed on the premise of time-sharing of resources. This traditional solution would require four receivers plus potentially four MAC electrical interfaces.

Referring to FIG. 1, a traditional system 100 comprises an optical transceiver board 102 with a matched set of optical transmitter (TX) and receiver (RX) ports 106. Each TX/RX port is coupled to a MAC interface 104. A wavelength-division multiplexer (WDM) 108 is coupled to each of the ports 106 to multiplex the optical carrier signal, and to a combiner 110, which is a passive device that combines the optical power carried by many input fibers into a single output fiber. The combiner 110 is coupled to an external PON 112. As previously mentioned, this type of a system is inefficient.

Therefore, what is needed is an ability to overcome these problems and limitations to allow the RX and TX ports to be managed more efficiently.

SUMMARY OF THE INVENTION

DWDM is an optical technology used to increase bandwidth over existing fiber optic backbones. The DWDM hybrid PON approach of the present disclosure is based on the idea that there are "N" downstream transmit signals (for example, four) but only one upstream receive signal. A Line Terminal (LT) card of the present disclosure would contain four transmitters and one receiver in a common or shared package, along with a single MAC interface chip. A LT card includes a central processor unit (CPU) and random access memory (RAM) for storing a control program in accordance with the type of terminals.

In one embodiment of the disclosure, an optical transceiver board for use in a Passive Optical Network (PON), comprising a line terminal (LT) card comprising a plurality of transmitters and one receiver, also comprising a Dense Wave Division Multiplex (DWDM) combiner, wherein the LT card is communicably coupled to the DWDM combiner; and comprising a broadband wavelength division multiplexer (WDM) communicably coupled to the DWDM combiner.

In another embodiment of the disclosure, a method, comprising receiving, by at least one transmitter, electrical signals from a first module, such as a Media Access Control (MAC), sending, by at the at least one transmitter, the signals to a second module, such as a DWDM Combiner, combining, by the second module, the sent signals, sending the combined signals to a third module, such as a broadband WDM, receiving, by the third module, other signals from a fourth module, such as a PON, receiving, by a receiver, the combined signals and the other signals from the fourth module, and sending, by the receiver, the combined signals and the other signals to the first module.

In a further embodiment of the disclosure a method, comprising sending, from a first external module, such as a MAC, first signals to a plurality of transmitters, receiving, at a second external module, such as a DWDM combiner, second signals related to the first signals, receiving, at a receiver, the second signals and third signals, from a broadband WDM, for example, and receiving, at the first external module, the second signals and third signals.

DETAILED DESCRIPTION OF THE INVENTION

Figure 1:
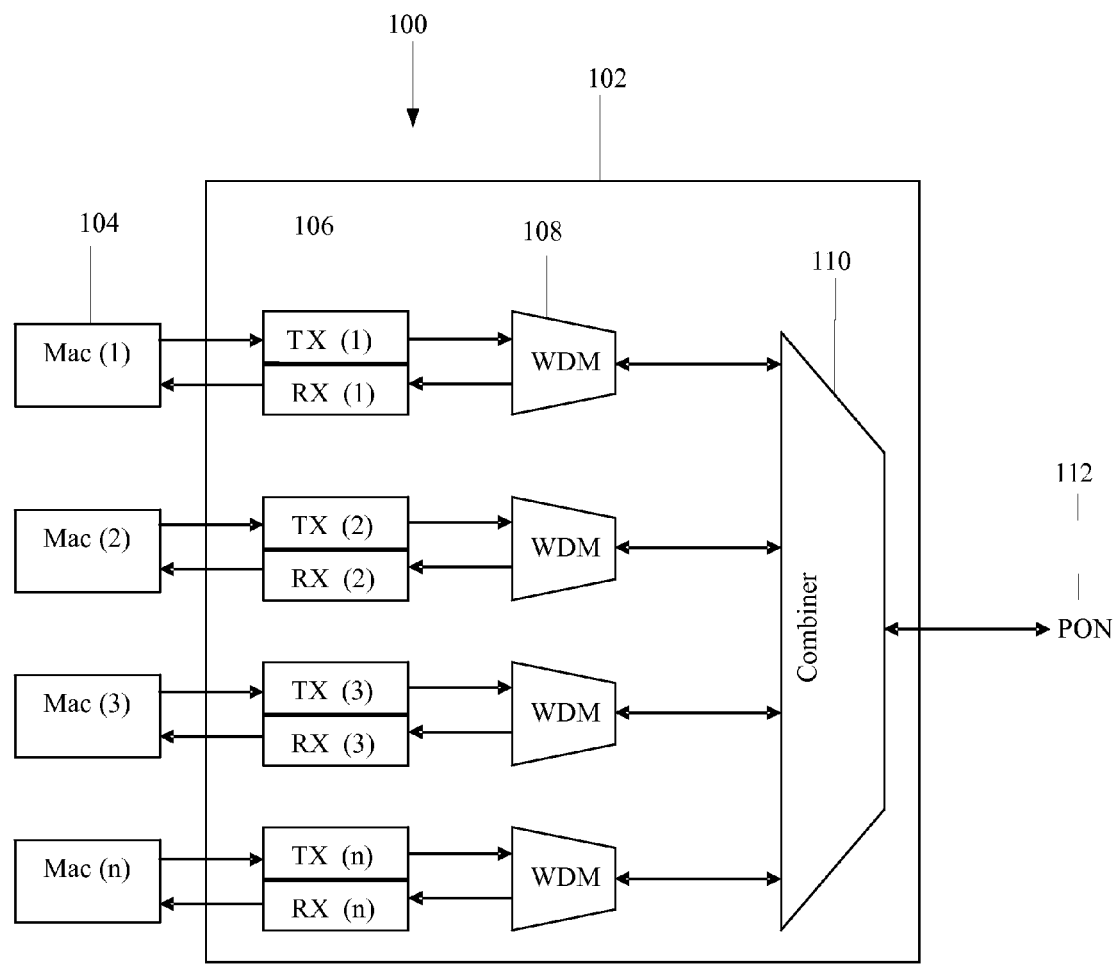
FIG. 1 represents a traditional system including a traditional optical transceiver board.
Figure 2:
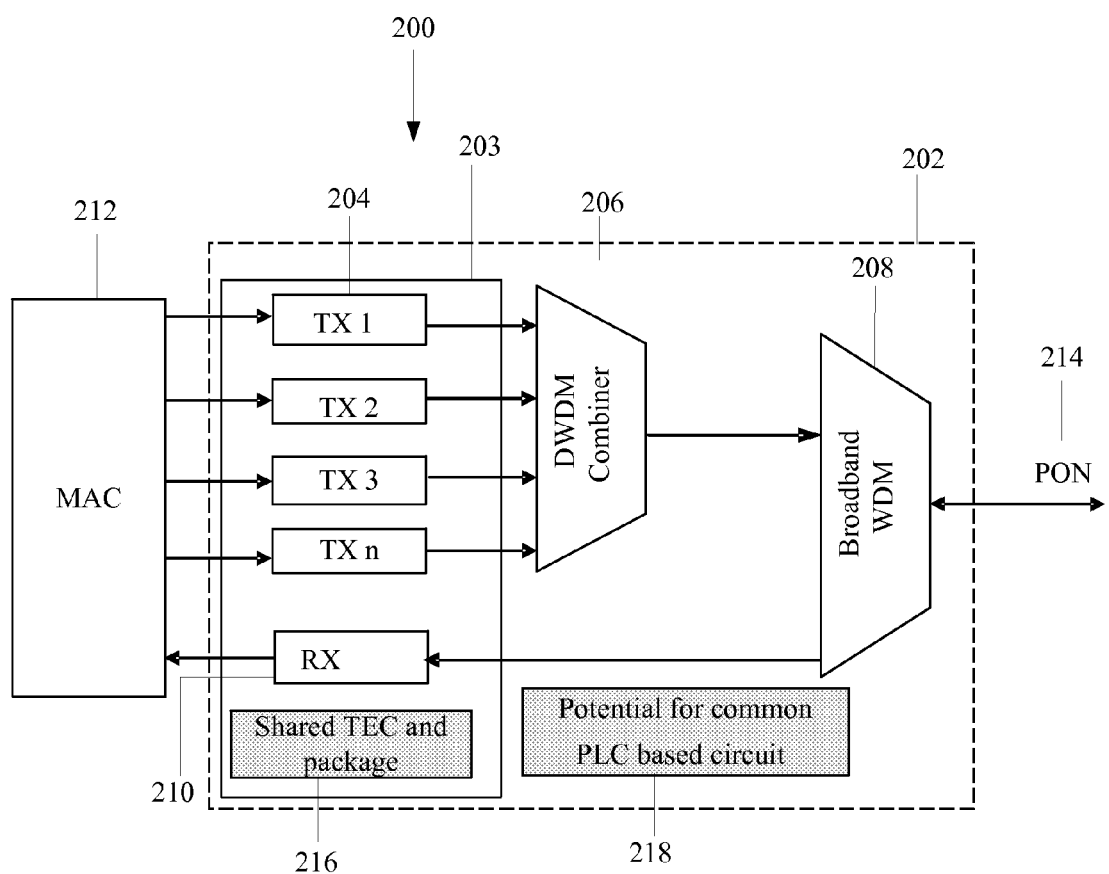
FIG. 2 illustrates a system including an optical transceiver board in accordance with an embodiment of the disclosure.

Referring now to FIG. 2, a system 200 of the present invention comprises an optical transceiver board 202 communicably coupled to a MAC interface 212 and to a PON 214. An optical transceiver board 202 of the present disclosure comprises a DWDM combiner 206 which is communicably coupled to a line terminal card or module 203 and to a broadband wavelength division multiplexer (WDM) 208. The module 203 comprises at least one transmitter 204 (which is communicably coupled to the MAC interface 212 and to the DWDM combiner 206) and one receiver 210 (which is communicably coupled to the MAC interface 212 and to the broadband WDM 208. The module 203, further optionally comprises a shared thermoelectric cooler (TEC) function and associated electronics 216.

In an embodiment of the present invention, a single TEC is utilized for multiple TXs without the RX. The optical transceiver board 202 further optionally comprises a common Planar Lightwave Circuit (PLC) 218.

In one embodiment of the present disclosure, to provide better efficiencies and cost savings, the transmitters 204 are shared on the module 203 (or on a common card or on a common package). By placing the transmitters 204 in a common package 203, the transmitters 204 can share the TEC function and associated electronics 216. A TEC is solid-state active heat pump which transfers heat from one side of the device to the other side against the temperature gradient (from cold to hot), with consumption of electrical energy. Further, if the single optical receiver 210 is also included in the common package 203, the receiver can utilize the TEC function and associated electronics 216 resulting in significant optical sensitivity improvement. This is especially true for Avalance photodiodes (APDs) which are the most sensitive photo detectors in the visible to near infrared region.

APDs include controlling voltages and temperature/gain profiles that are very difficult to control over wide temperature ranges. By maintaining the APD at an effective fixed temperature (which is needed for the DWDM laser wavelength stabilization), an improvement of 2-3 dB is experienced in the LTs sensitivity.

This sensitivity improvement becomes significant when considering the possibility that the difference in losses between downstream and upstream DWDM Hybrid PONs might be in the order of 3-4 dB. Utilizing the optical transceiver board 202 will normalize the downstream and upstream losses, allowing extended PON performance. A downstream link is one of the N number of OLT to ONT paths in the downstream direction that utilizes a unique wavelength as described above. An upstream link is the path from all of the ONTs to the OLT that utilizes the common 1310 nm wavelength.

The OLT should understand which of the downstream links each of the ONTs are located on. This location information is required because the OLT must send down information such as OAM messages, bandwidth maps and traffic on the correct downstream link. Several techniques can be implemented as described below.

In another embodiment of the present disclosure, the use of the four transmitter wavelength combiner 206 and the broadband WDM filter 208 (1490 nm wavelength downstream, 1310 nm wavelength upstream) in the optical transceiver board 202 produces various advantages as described below.

In yet another embodiment of the present disclosure, "N" (for example, four) transmit signals 204 and a common receive signal 210 are utilized as opposed to processing four individual receive signals, with each on 1/"N" of the total upstream traffic, including "N" MAC interfaces. Utilizing the common Planar Lightwave Circuit (PLC) 218 on the optical transceiver board 202 provides optical component integration and large-scale manufacturing advantages including greater heat-dissipation.

Figure 3:
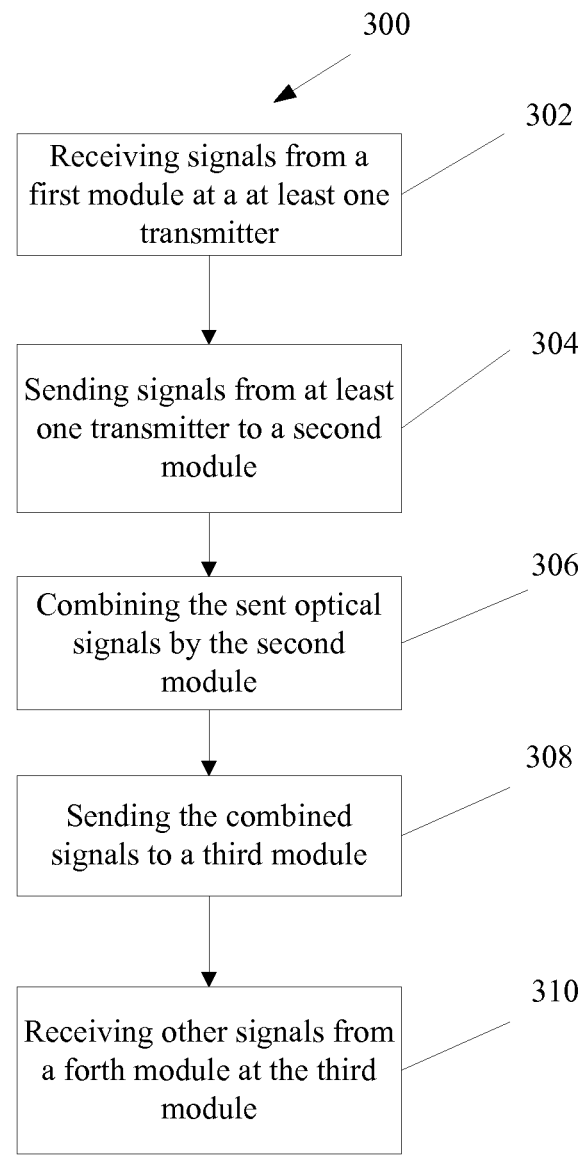
FIG. 3 represents a flow chart for a method for a DWDM hybrid PON LT in accordance with an embodiment of the disclosure.

Referring now to FIG. 3, a flow chart 300 for a method for a DWDM hybrid PON LT configuration is depicted. The method begins at step 302 when signals are received from a first module, such as a MAC, at a plurality of transmitters. In step 304, signals are sent from the plurality of transmitters to a second module, such as a DWDM combiner. In step 306, the sent signals are combined by the second module. In step 308, the combined signals are sent to a third module, such as a broadband WDM. In step 310, other signals are received at the third module from a fourth module, such as a PON.

Figure 4:
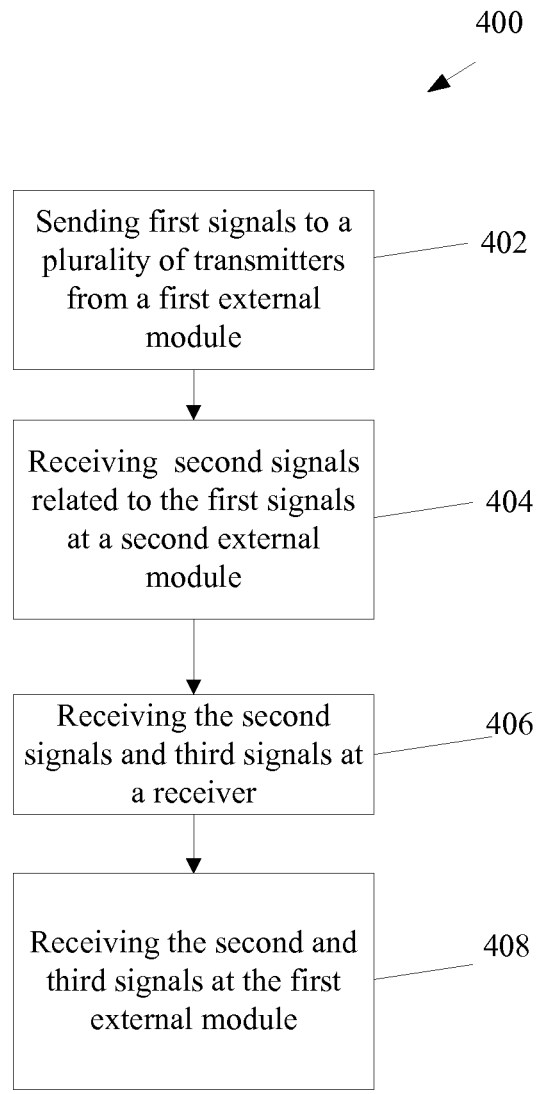
FIG. 4 represents a further flowchart for a DWDM hybrid PON LT in accordance with an embodiment of the disclosure.

Referring now to FIG. 4, a flow chart 400 for a DWDM hybrid PON LT configuration in accordance with an embodiment of the disclosure. The method begins at step 402 when first signals are sent to a plurality of transmitters from a first external module, such as a MAC. The signals sent from the first external module are either a first signal, or signals that were received by the external module. In step 404, a second external module receives second signals related to the first signals. In step 406, a receiver receives the second and third signals. The plurality of transmitters and the receiver are integrated in a common module. In step 408, the first external module receives the second and third signals.

In one embodiment of the disclosure, an optical transceiver board for use in a Passive Optical Network (PON), comprising a line terminal (LT) card comprising a plurality of transmitters and one receiver, also comprising a Dense Wave Division Multiplex (DWDM) combiner, wherein the LT card is communicably coupled to the DWDM combiner, and comprising a broadband wavelength division multiplexer (WDM) communicably coupled to the DWDM combiner, wherein the plurality of transmitters are communicably coupled to the DWDM combiner, wherein the broadband WDM is communicably coupled to the receiver. The optical transceiver board also comprises a thermoelectric cooler (TEC) wherein an output of the TEC is shared between the plurality of transmitters and the one receiver, wherein the TEC transfers heat from one side of the LT card to another side of the LT card, wherein the LT card receives an input from a Media Access Control (MAC) interface, wherein the input is an electrical signal, wherein the input is received by the plurality of transmitters, wherein the receiver is communicably coupled to the MAC interface, and wherein the MAC receives an input from the receiver. The optical transceiver board also comprises a broadband WDM that is communicably coupled to a Passive Optical Network (PON).

In another embodiment of the disclosure, a method, comprising receiving, by at least one transmitter, signals from a first module, such as a MAC, sending, by at the at least one transmitter, the signals to a second module, such as a DWDM Combiner, combining, by the second module, the sent signals, sending the combined optical signals to a third module, such as a broadband WDM, receiving, by the third module, other signals from a fourth module, such as a PON, receiving, by a receiver, the combined signals and the other signals from the fourth module, and sending, by the receiver, the combined signals and the other signals to the first module, wherein receiving, by the fourth module, the combined signals, wherein the at least one transmitter and the receiver are co-located, and wherein the second module and the third module are co-located with the least one transmitter and the receiver.

In a further embodiment of the disclosure, a method, comprising sending, from a first external module, such as a MAC, first signals to a plurality of transmitters, receiving, at a second external module, such as a broadband WDM, second signals related to the first signals, receiving, at a receiver, the second signals and third signals, and receiving, at the first external module, the second signals and third signals, wherein sending, from the first external module to the plurality of transmitters, at least one of the first signals, the second signals, and the third signals, and a method wherein the third signals are received from the second external module, and wherein the plurality of transmitters and the receiver are integrated in a common module.

Systems, methods, and devices have been shown and/or described in the above embodiments for a DWDM hybrid PON LT configuration. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. An optical transceiver board for use in a Passive Optical Network (PON), comprising:
   a line terminal (LT) card comprising a plurality of transmitters and one receiver arrange together in a common module with a shared thermoelectric cooler (TEC) heat pump which transfers heat away from the plurality of transmitters and the one receiver;
   a Dense Wave Division Multiplex (DWDM) combiner configured to perform signal combining of a plurality of signals received from the plurality of transmitters, wherein the LT card is a separate module from the DWDM combiner and is communicably coupled to the DWDM combiner; and
   a broadband wavelength division multiplexer (WDM) communicably coupled to the DWDM combiner; and
   wherein the broadband WDM is configured to receive the combined plurality of signals corresponding to the plurality of transmitters and at least one signal from a passive optical network (PON), and is further configured to transmit the at least one signal from the PON to the one receiver, and
   wherein the one receiver is configured to convert the received at least one signal into an electrical signal and transfer the electrical signal to a media access control (MAC) interface, which is communicably coupled to the plurality of transmitters and sends electrical signals to the plurality of transmitters.

2. The optical transceiver board of claim 1, wherein the plurality of transmitters are communicably coupled to the DWDM combiner.

3. The optical transceiver board of claim 1, wherein the broadband WDM is communicably coupled to the receiver.

4. The optical transceiver board of claim 1, wherein the LT card receives an input from a Media Access Control (MAC) interface.

5. The optical transceiver board of claim 4, wherein the input is an electrical signal.

6. The optical transceiver board of claim 4, wherein the input is received by the plurality of transmitters.

7. The optical transceiver board of claim 4, wherein the receiver is communicably coupled to the MAC interface.

8. The optical transceiver board of claim 7, wherein the MAC receives an input from the receiver.

9. The optical transceiver board of claim 1, wherein the broadband WDM is communicably coupled to a Passive Optical Network (PON).

10. A method, comprising:
    receiving, by a plurality of transmitters, electrical signals from a media access control (MAC) interface;
    converting, by the plurality of transmitters, the electrical signals into optical signals; sending, by the plurality of transmitters, the optical signals to a Dense Wave Division Wavelength (DWDM)combiner;
    combining, by the DWDM combiner, the sent optical signals;
    sending the combined signals to a broadband wavelength division multiplexer (WDM) coupled to the DWDM combiner;
    receiving, by the broadband WDM, optical signals from a passive optical network (PON);
    receiving, by a single receiver, the optical signals from the broadband WDM; and
    converting, by the single receiver, the optical signals into electrical signals; and
    sending, by the single receiver, the electrical signals to the MAC interface, which is communicably coupled coupled to the plurality of transmitters, and wherein the single receiver and the plurality of transmitters are arranged together in a common module with a shared thermoelectric cooler (TEC) heat pump which transfers heat away from the plurality of transmitters and the one receiver, and
    wherein the common module is a separate module from the DWDM combiner and is communicably coupled to the DWDM combiner.

11. The method of claim 10 comprising receiving, by the PON, the combined signals.

12. The method of claim 10, wherein the plurality of transmitters and the single receiver are co-located.

13. The method of claim 10, wherein the DWDM combiner and the broadband WDM are co-located with the plurality of transmitters and the single receiver.

* * * * *